(Model.)

E. L. DUNLAP.
ANIMAL TRAP.

No. 407,646.      Patented July 23, 1889.

Witnesses:
E. P. Ellis,
J. M. Nesbit

Inventor:
Ephraim L. Dunlap,
per
J. A. Lehmann,
atty.

UNITED STATES PATENT OFFICE.

EPHRAIM L. DUNLAP, OF KINGFIELD, MAINE.

ANIMAL-TRAP.

SPECIFICATION forming part of Letters Patent No. 407,646, dated July 23, 1889.

Application filed May 3, 1889. Serial No. 309,469. (Model.)

*To all whom it may concern:*

Be it known that I, EPHRAIM L. DUNLAP, of Kingfield, in the county of Franklin and State of Maine, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in animal-traps; and it consists in the combination of an L-shaped jaw provided with teeth at its lower end, a second jaw also provided with teeth, and an arm or projection over which the trigger passes, a spring connected to and operating the second jaw, and the hook upon which the bait is placed, all of which will be more fully described hereinafter.

The object of my invention is to construct a trap which is provided with a spring-jaw which descends upon the head of the animal when it attempts to take the bait.

Figure 1:
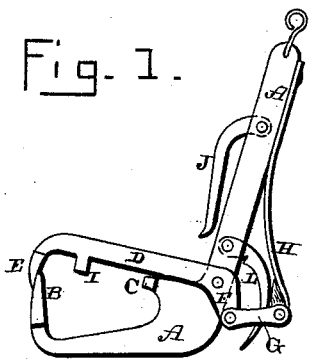
Figure 2:
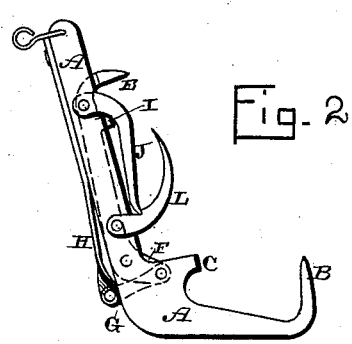

Figure 1 is a side elevation of a trap which embodies my invention, the parts being shown in one position. Fig. 2 is a similar view showing the parts set for operation and taken from the opposite side.

A represents the main portion or jaw of the trap and which is made L-shaped, as shown, and provided with the sharp points B at its lower end, and which points are turned upward so as to catch against the under side of the animal's head. Projecting from this part A, near the lower end, is the stop C, which limits the distance that the movable jaw shall descend. To the upper end of the jaw A is attached a ring or link, to which a cord, wire, or chain is to be fastened, so as to keep the animal from running away with the trap.

Pivoted to the jaw A is the movable jaw D, which is also provided with sharp points E and with a short angular end F, to which the connecting-link G is fastened. To the outer end of the link is pivoted the lower end of the spring H, which is fastened at its upper end to the upper end of the jaw A. The link allows the jaw D to move freely through a quarter of a circle. Projecting from one side of this jaw D is an arm I, and over this arm is passed the curved or bent trigger J, which is pivoted at its upper end to the jaw A. The lower end of the trigger catches in a notch in the upper edge of the hook L, upon which the bait is placed.

The trap being placed in such a position that the animal cannot take the bait from the side, the animal must insert its head between the two jaws so as to reach the bait. As soon as a pull is exerted upon the hook the trigger is released and the spring causes the jaw D to instantly close, so as to bring the sharp points B E together with the full force of the spring. These sharp points catch the animal's head between them and either kill the animal outright or hold it so that it cannot get away.

Having thus described my invention, I claim—

The combination of the angular jaw A, provided with stop C and the sharp points B upon its lower end, the jaw D, provided with sharp points at one end and a crank or bend at its opposite end and pivoted upon the jaw A and having a projection I upon its inner edge, the spring H, connected at one end to the jaw A, the connecting-link G, which unites the ends of the spring and the jaw D together, the trigger J, pivoted to the jaw A and adapted to catch over the projection I upon the jaw D, and the notched hook L, pivoted to the jaw A and adapted to engage with the trigger, substantially as shown and described.

In testimony whereof I affix my signature in presence of two witnesses.

EPHRAIM L. DUNLAP.

Witnesses:
BURTON SMALL,
PHILANDER BUTTS.